US011898361B2

(12) United States Patent
Walraven

(10) Patent No.: US 11,898,361 B2
(45) Date of Patent: Feb. 13, 2024

(54) COLUMN CLIMBING BUILDING SITE PROTECTION DEVICE, SYSTEM AND METHOD

(71) Applicant: Garrett Walraven, Bay City, MI (US)

(72) Inventor: Garrett Walraven, Bay City, MI (US)

( * ) Notice: Subject to any disclaimer, the term of this patent is extended or adjusted under 35 U.S.C. 154(b) by 583 days.

(21) Appl. No.: 17/150,336

(22) Filed: Jan. 15, 2021

(65) Prior Publication Data

US 2021/0222445 A1 Jul. 22, 2021

Related U.S. Application Data

(60) Provisional application No. 62/962,261, filed on Jan. 17, 2020.

(51) Int. Cl.
*E04G 21/30* (2006.01)
*E04G 21/28* (2006.01)
*B66F 19/00* (2006.01)
*B66F 11/00* (2006.01)
*E04G 21/24* (2006.01)

(52) U.S. Cl.
CPC .............. *E04G 21/30* (2013.01); *B66F 11/00* (2013.01); *B66F 19/00* (2013.01); *E04G 21/28* (2013.01); *E04G 2021/248* (2013.01)

(58) Field of Classification Search
CPC ......... E04G 21/30; E04G 21/32; E04G 21/28; E04G 2021/248; B66F 19/00; B66F 11/00; A63B 27/00
See application file for complete search history.

(56) References Cited

U.S. PATENT DOCUMENTS 3,727,723 A * 4/1973 Pitcairn .................. A63B 27/00 182/141
4,549,633 A * 10/1985 Merritt .................. A01M 31/02 182/135
4,793,439 A * 12/1988 Crawford ................ B66F 1/025 182/136
5,351,783 A * 10/1994 Celli ......................... B66B 9/02 182/141
5,464,315 A * 11/1995 Palmer .................... B66F 19/00 414/451
5,772,183 A * 6/1998 Sears ...................... B66C 5/025 254/323
5,944,139 A * 8/1999 Kozial ................... A63B 27/00 182/92

(Continued)

*Primary Examiner* — Beth A Stephan
(74) *Attorney, Agent, or Firm* — Young Basile Hanlon & MacFarlane, P.C.

(57) ABSTRACT

A device for raising a temporary wall to enclose an area includes a main body, a drive wheel attached centrally to the main body, a motor mounted on the main body and configured to drive the drive wheel, and a hook portion attached each end of the main body. Each hook portion has an arm member extending from the main body, a wheel support member extending from the arm member, the wheel support member extending substantially parallel to the main body, a wheel attached to the wheel support member on a surface facing the main body, and a depth adjustment mechanism configured to adjust a depth of the device by adjusting a length of the arm member. The device also includes a width adjustment mechanism configured to adjust a width of a gap between the wheel support members and a loop member attached to the main body.

16 Claims, 11 Drawing Sheets

(56) References Cited

U.S. PATENT DOCUMENTS

| | | | | | |
|---|---|---|---|---|---|
| 6,079,517 | A * | 6/2000 | Payne | A45F 3/26 182/187 |
| 6,474,377 | B1 * | 11/2002 | Van De Mortel | A01G 23/0955 47/1.01 R |
| 8,104,574 | B1 * | 1/2012 | Kellenaers | E04G 21/24 160/184 |
| 9,433,308 | B1 * | 9/2016 | Kalinski | A47G 5/02 |
| 2002/0036116 | A1 * | 3/2002 | Hess | E06C 7/08 182/20 |
| 2006/0130933 | A1 * | 6/2006 | Smith | A01G 23/0955 144/208.2 |
| 2007/0176158 | A1 * | 8/2007 | Robinson | E01F 13/028 256/12.5 |
| 2010/0313493 | A1 * | 12/2010 | Kamp | G09F 19/22 52/506.01 |
| 2015/0166313 | A1 * | 6/2015 | Knapp | B66F 11/04 254/89 R |
| 2016/0038240 | A1 * | 2/2016 | Guerrero | B66F 3/00 254/133 R |
| 2017/0030093 | A1 * | 2/2017 | Go | E04G 21/24 |
| 2018/0055040 | A1 * | 3/2018 | Abouelmakarem | A61G 5/104 |
| 2019/0233266 | A1 * | 8/2019 | Delaney | B66F 19/00 |
| 2023/0020395 | A1 * | 1/2023 | Youssef | E04G 21/3295 |

* cited by examiner

COLUMN CLIMBING BUILDING SITE PROTECTION DEVICE, SYSTEM AND METHOD

CROSS-REFERENCE TO RELATED APPLICATION

This application claims priority to U.S. Provisional Patent Application Ser. No. 62/962,261, filed on Jan. 17, 2020, the entire contents incorporated in its entirety herein.

TECHNICAL FIELD

This disclosure relates to an adjustable structural column climbing building site protection device and system for protecting exposed building sites from weather and dust, for example, during the construction phases, and methods of the same.

BACKGROUND

Current procedures to enclose buildings during the construction phase are very extensive in man hours and equipment and impact project schedules. Enclosing building sites during construction is needed for many reasons, such as temperature, wind, precipitation, debris, and others. The building sites require protection for both the employees and also the construction tasks that take place prior to permanent enclosure, such as pouring concrete and initial utility installation. Traditional procedures include, for example, using man lifts to reach vertical heights to manually fasten plastic or tarp to a steel structure, such as I-beams. Multiple man lifts and many man hours are required, including a spotter on the ground to meet OSHA requirements. The current methods result in safety hazards, including being struck by equipment, pinch points, falls, hand injuries and others.

SUMMARY

Disclosed herein are implementations of a device for raising a temporary wall to enclose an area, such as an area of a building site that is under construction, although the enclosed area is not limited to such. One implementation of the device comprises a main body, a drive wheel attached to the main body and positioned centrally on the main body, a motor mounted on the main body and configured to drive the drive wheel, and a hook portion attached proximate each end of the main body. Each hook portion comprises an arm member extending from a rear surface of the main body, a wheel support member extending from the arm member at an end opposite the main body, the wheel support member extending substantially parallel to the main body, a wheel attached to the wheel support member on a surface facing the main body, and a depth adjustment mechanism configured to adjust a depth of the device by adjusting a length of the arm member. The device also comprises a width adjustment mechanism, wherein the wheel support members of the hook portions extend toward each other, the width adjustment mechanism is configured to adjust a width of a gap between the wheel support members, and a loop member attached to the main body and configured to receive a cable therethrough.

Another implementation of the device comprises a fixed portion having a main body and a hook portion at each end of the main body, the fixed portion comprising a fixed portion width adjustment mechanism configured to adjust a width of a gap between the hook portions and a drive crank. The device also comprises a movable portion having a main body and a hook portion at each end of the main body, the movable portion comprising: a movable portion width adjustment mechanism configured to adjust a width of a gap between the hook portions; a depth adjustment mechanism configured to adjust a depth of the movable portion; a drive wheel on the main body; a wheel on each hook portion on a surface of the hook portion facing the main body; drive gears connected via a wheel shaft to the drive wheel; and a cable shaft wrapped with a cable and connected to the drive gears, the cable connected to the drive crank of the fixed portion, the cable shaft configured to rotate to move the drive gears as the drive crank pulls the cable and unwinds the cable from the cable shaft.

Another implementation of the device for raising a temporary wall to enclose an area comprises a main body, a drive wheel attached to the main body, a motor mounted on the main body and configured to drive the drive wheel, and a hook portion attached proximate each end of the main body. Each hook portion comprises a wheel support member extending substantially parallel to the main body and a wheel attached to the wheel support member on a surface facing the main body. The device further includes a width adjustment mechanism, wherein the wheel support members of the hook portions extend toward each other, and the width adjustment mechanism is configured to adjust a width of a gap between the wheel support members.

The devices disclosed herein can also include a light attached to the main body and/or a safety harness tie off attached to the main body.

The devices disclosed herein can further comprise a wedge mechanism attached to each arm member on an interior surface, each wedge mechanism comprising: a wedge having an upper end, a lower end, and a pin receiving portion between the upper end and the lower end, the lower end having a V-shaped notch; and a pin biased to a position within the pin receiving portion. The wedge can be attached to a respective arm member such that the lower end is biased away from the arm member. The pin can hold the wedge in a position perpendicular to the arm member when in the pin receiving portion. The wedge can be in a position oblique to the arm member when the pin is not in the pin receiving portion.

Also disclosed herein are methods of using the device and methods of installing a temporary wall. One method of installing a temporary wall uses two of the devices disclosed herein, wherein a first device hangs one corner of the temporary wall and a second device hangs an opposing corner of the temporary wall. The method comprises positioning the first device to a first I-beam and the second device to a second I-beam, the temporary wall being configured to be installed to span a space between the first I-beam and the second I-beam, and threading a cable configured to support the temporary wall through the loop member of the first device, with one end of the cable fixed proximate a base of the first I-beam and a distal end left available to attach to the temporary wall. The first device is moved along the first I-beam to a desired height, attaching the temporary wall to the cable via the distal end of the cable, threading the distal end through a loop member of the second device and fixing the distal end proximate a base of the second I-beam. The second device is moved along the I-beam to the desired height.

A method of using the device disclosed herein to raise a temporary wall comprises positioning the device to the I-beam by: adjusting the width adjustment mechanism such that the gap is wider than a width of the I-beam; positioning the device such that the drive wheel contacts a front surface of the I-beam; adjusting the width adjustment mechanism such that the wheel of each hook portion is aligned to contact an opposing surface of the I-beam; and adjusting the depth adjustment mechanism of each hook portion such that the wheel of each hook portion contacts the opposing surface of the I-beam. The method further comprises threading a cable configured to support the temporary wall through the loop member of the device, with one end of the cable fixed proximate a base of the I-beam and a distal end left available to attach to the temporary wall; and moving the device along the I-beam to a desired height by operating the motor to move the drive wheel in a direction to move the device along the I-beam to the desired height.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The column climbing building site protection device disclosed herein securely attaches a temporary wall such as a tarp (herein referring to any material hung at the building site to protect the building site, including plastic, canvas, and other materials) without the need for man lifts and multiple number of personnel and man hours typically required. The temporary walls are securely hung to withstand wind force and are taut enough to ensure the internal workspace has minimal exposure to outside elements. As a non-limiting example, the column climbing building site protection device disclosed herein replaces traditional manual hanging methods that can take about five 8-10 hour days, ten personnel and four man lifts to hang a 600 lineal foot perimeter floor plan. Using the disclosed column climbing building site protection device, hanging tarps around the 600 lineal foot perimeter would require around four hours, estimating I-beams that are evenly distributed around the perimeter. To raise one 50' long by 35' high section of tarp takes approximately 25 minutes per I-beam, with a climb rate of six feet per minute. Beyond the time-saving aspects realized by the disclosed device, the need for large equipment (e.g., man-lifts, forklifts) is reduced. One forklift to move the tarps to the proper locations is required. The device has been designed to be light enough that a single person can move it.

The column climbing building site protection device disclosed herein can hang a durable temporary wall with the use of cables, rather than thin plastic sheets that are often conventionally used and attached with zip ties. Single-use plastics such as the plastic sheeting and zip ties contribute to the waste going to landfills from building sites.

There are implementations of the column climbing building site protection device disclosed herein. One incorporates an affixed portion with a crank to move a movable portion of the device up the I-beam. A second incorporates a motor to move the device up the I-beam, with the entire device being movable. The implementations are described herein and share additional aspects described herein. Broadly, the device comprises a steel structure that wraps around one half of a vertical structural I-beam. The device, once fit to the I-beam, then climbs up the I-beam using the motor or the manual means. Once at the desired level, the device is stopped and the process moves to raising the temporary wall. The device can also be used to install temporary lighting for a designated area, to provide temporary tie off points on any desired vertical structure and to allow for the installation of temporary horizontal covers of any designated area.

Figure 1A:
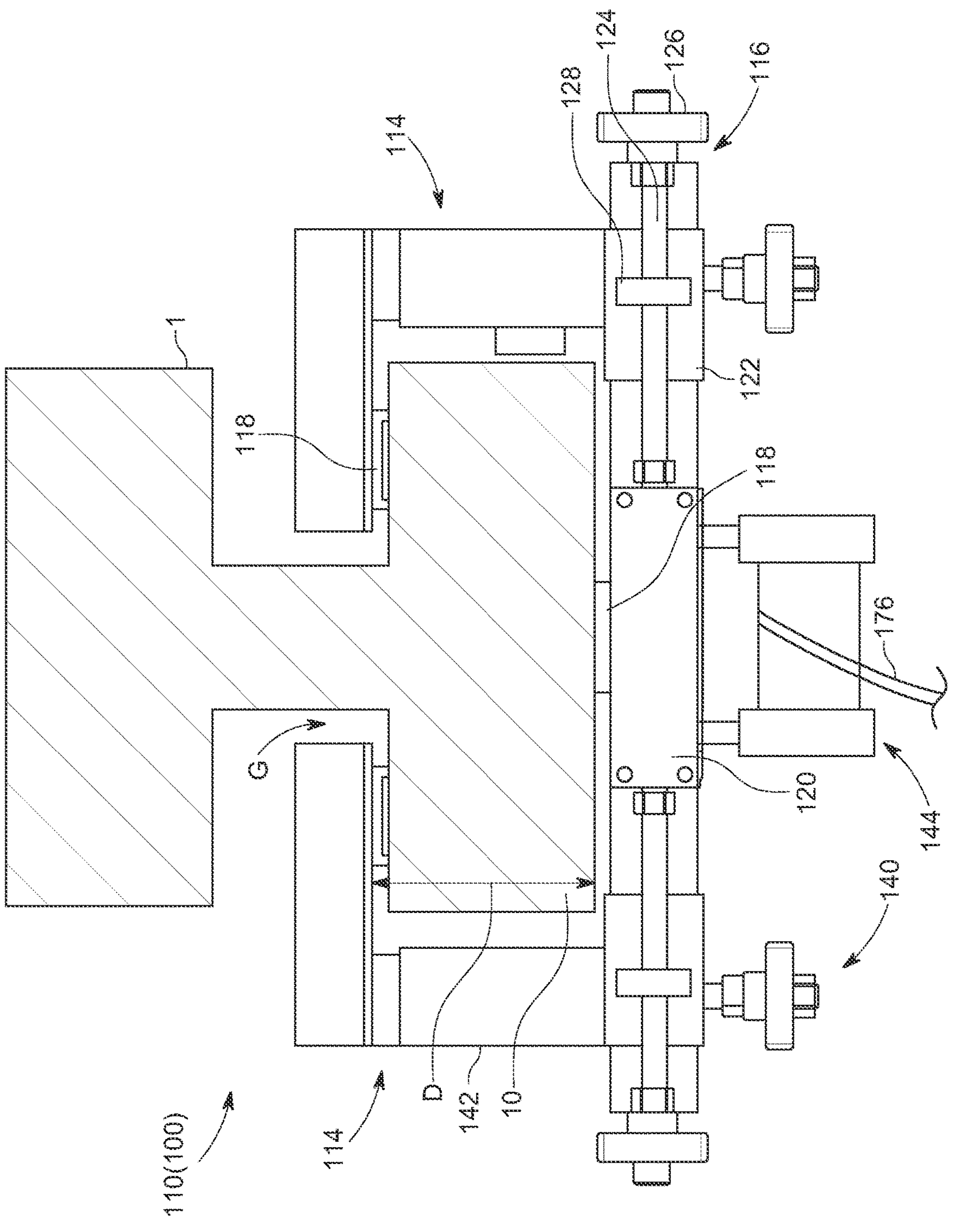
FIGS. 1A and 1B are plan views of a fixed portion and a moveable portion, respectively, of an implementation of a column climbing building protection device as disclosed herein.
Figure 1B:
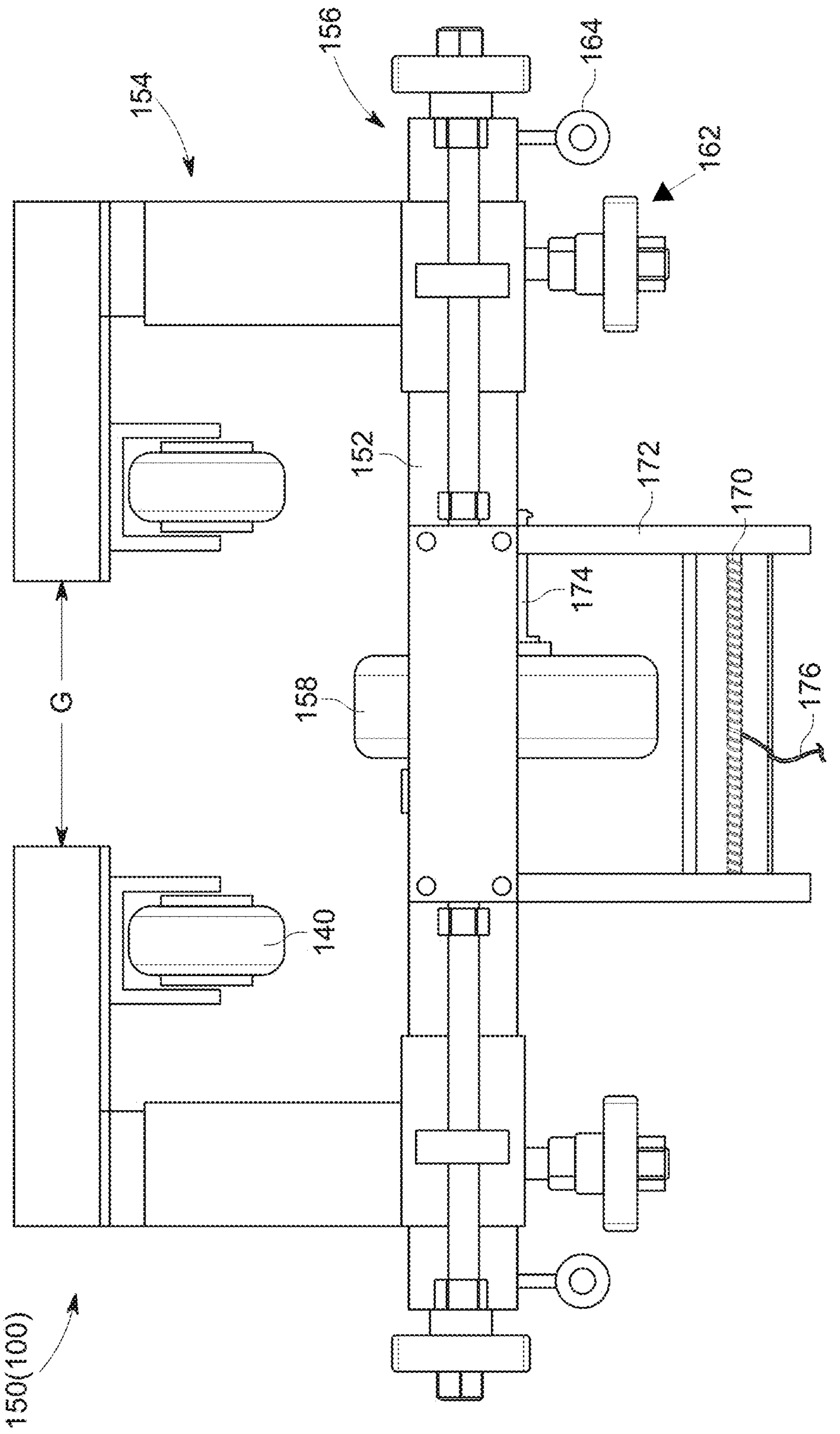

An implementation of the column climbing building site protection device is illustrated in FIGS. 1A and 1B. The device 100 has a fixed portion 110 illustrated in FIG. 1A and a movable portion 150 illustrated in FIG. 1B. The movable portion 150 sits on top of the fixed portion 110 when not in use. The fixed portion 110 has a main body 112 with a U-shaped or hook portion 114 at each end. A width adjustment mechanism 116 is a sliding mechanism that allows the hook portions 114 to be moved further apart or allows the main body 112 to be lengthened so that the hook portions 114 can be positioned around an I-beam. The width adjustment mechanism 116 is used to move the hook portions 114 closer together, or shorten the length of the main body 112, so that the hook portions 114 grab the edges of the I-beam. The width adjustment mechanism 116 is then locked in place when the fixed portion 110 is secure on the I-beam. The fixed portion 110 of the device 100 includes studs 118 positioned along the main body 112 and the hook portions 114 to assist in creating a tight hold between the fixed portion 110 and the I-beam.

In one implementation of the width adjustment mechanism 116, the main body 112 includes a fixed element 120 with two sleeves 122 over the fixed element 120 at opposing ends of the fixed element 120. A hook portion 114 is attached to a respective sleeve 122. The width of a gap G is adjusted by moving the sleeves 122 over the fixed element 120. A threaded rod 124 is attached to the fixed element 120 and a receiver 128 is attached to the sleeve 122 and receives the threaded rod 124. When the threaded rod 124 is rotated, via a handle 126, the receiver 128, such as a nut or the like, moves along the threaded rod 124 and moves the sleeve 122 along with it. The sleeve 122 can be moved by turning the handle 126 that turns the threaded rod 124 extending through a receiver 128, such as a nut or the like attached to the sleeve 122.

Figure 2:
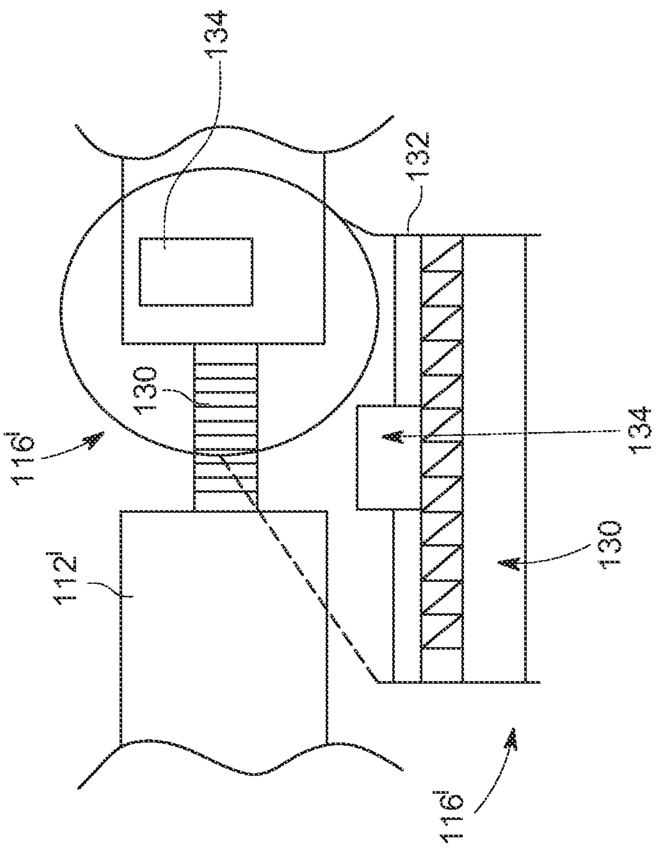
FIG. 2 is an enlarged view of an aspect of a width adjustment mechanism as disclosed herein.

Alternatively, as illustrated in FIG. 2, the hook portions can be directly attached to the main body 112', with no sleeve, and the width adjustment mechanism 116' can lengthen and shorten the main body 112' to adjust the width of the gap G. The width adjustment mechanism 116' can include a ratchet bar 130 affixed to one portion of the main body 112' and having angled teeth, and a cog 132 with corresponding teeth affixed to another portion of the main body 112' and that engage the teeth of the ratchet bar 130. A release button 134 releases the cog 132 from the ratchet bar 130 so the width of the main body 112' can be elongated so the hook portions 114 fit around the I-beam. The ratchet bar 130 and the cog 132 work together as the width of the main body 112' is shortened, the teeth of the cog 132 grabbing the teeth of the ratchet bar 130 and locking once the proper width is achieved. A cross-section of the mechanism in the circle is enlarged to better see the corresponding teeth. Other means of adjusting the width of the main body 112, 112' known to those skilled in the art are contemplated.

The depth D of the hook portion 114 can be sized to snuggly accommodate a wall 10 of the I-beam illustrated in FIG. 1A when the fixed portion 110 is positioned on the I-beam 1. Alternatively, the fixed portion 110 can be a depth adjustment mechanism 140 that adjusts the depth of the hook portion 114 by shortening or lengthening an arm 142 of the hook portion. The depth adjustment mechanism 140 can be implemented in one of the ways described with respect to the width adjustment mechanism 116, 116'.

The fixed portion 110 also has a drive crank 144, which can be manually operated with a handle that is cranked, can be operated with electrical power, or can be operated with a motor to turn the drive crank 144.

The movable portion 150 of the device 100 is illustrated in FIG. 1B. The movable portion 150 includes a main body 152 and u-shaped, or hook portions 154, at each end of the main body 152. A width adjustment mechanism 156 is incorporated into the main body 152 to adjust the width of the gap G between the hook portions 154. The width adjustment mechanism 156 can be achieved as described herein with respect to the width adjustment mechanism 116, 116'. The main body 152 is attached to a drive wheel 158 configured to roll along a face of the I-beam. The hook portions 154 each have at least one wheel 160 configured to roll along an opposite face of the I-beam. The hook portions 154 each include a depth adjustment mechanism 162 to adjust the depth of the hook portions 154 so that there is a tight friction fit between the drive wheel 158 and the face of the I-beam and the wheels 160 and the opposing face of the I-beam (illustrated in FIG. 4). The depth adjustment mechanism 162 can be achieved as described with respect to the width adjustment mechanism 116, 116'. The number of the wheels 160 can vary but should be selected to ensure the movable portion 150 can move up the column sufficiently smoothly. The movable portion 150 has a tarp loop member 164 at each end of the main body 152. On the main body 152 is a shaft 170 supported between two members 172 fixed to the main body 152. The shaft 170 is connected to drive gears aligned in at least one member 172 that move the drive wheel 158 through a wheel shaft 174. Drive cable 176 is wrapped around the shaft 170 and connected to the drive crank 144 of the fixed portion 110. The drive crank 144 cranks the drive cable 176, pulling it from the shaft 170, in turn turning the shaft 170, which turns the drive wheel 158 via the drive gears.

Figure 3:
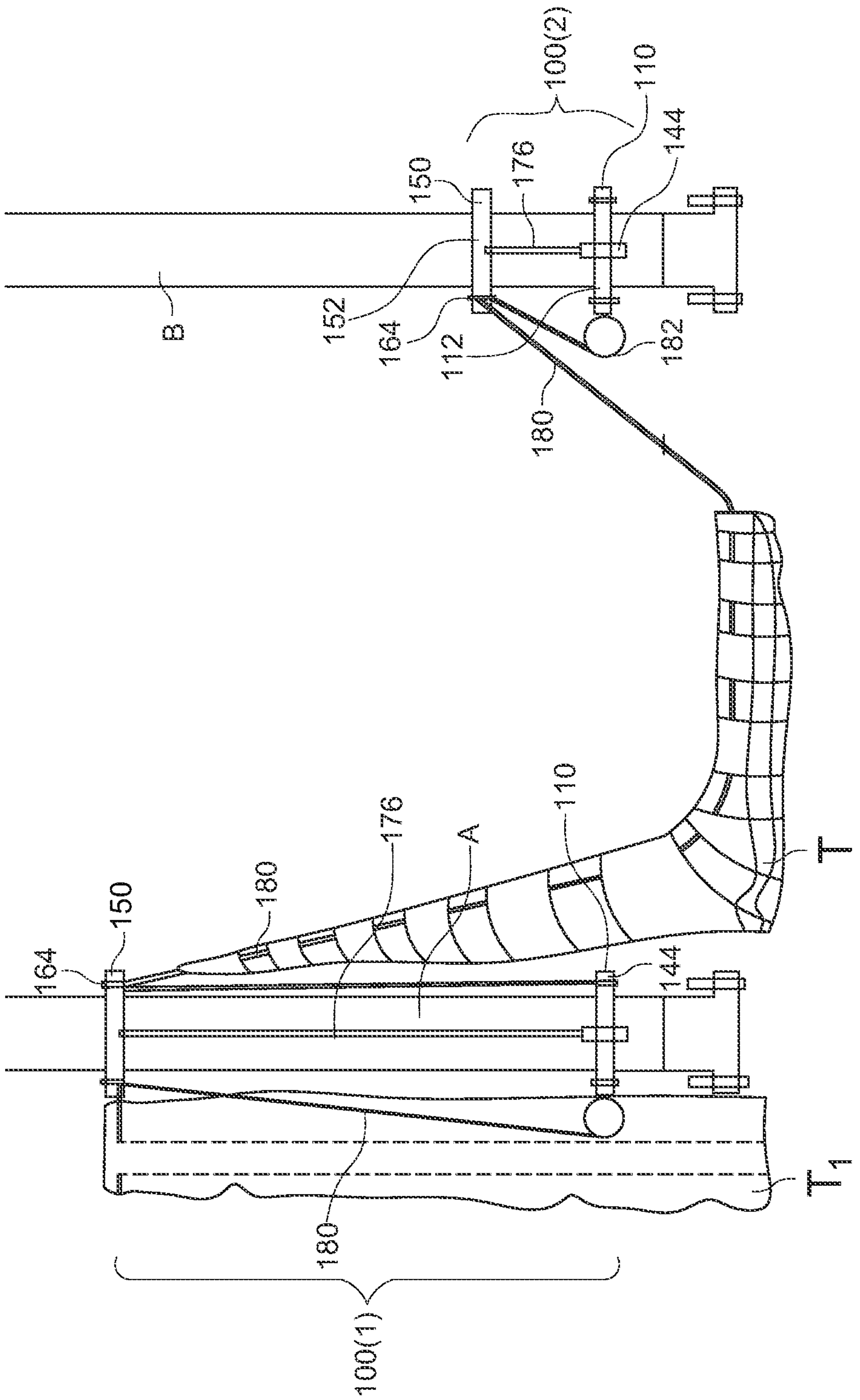
FIG. 3 is a schematic of the process of installing a temporary wall using two of the devices shown in FIGS. 1A and 1B, a device located on a respective column.

Before the movable portion 150 is moved up the I-beam, a tarp cable 180 is attached to a fixed tie off 182, illustrated in FIG. 3 as an eye bolt on the fixed portion 110, but can be attached or clamped directly to the I-beam as an alternative. The tarp cable 180 is threaded through the tarp loop member 164 on the movable portion 150 and attached to the temporary wall, or tarp T. The temporary wall can be a curtain or tarp that is plastic or some kind of cloth, and the tarp cable 180 can be affixed to a corner of the temporary wall T or can be fed through a hemmed end or through loops or apertures made along a top edge of the temporary wall T. The distal end of the tarp cable 180 can be left loose or can be tied of at the fixed tie off 182 of another device 100. Alternatively, the loose end of the tarp cable 180 can be left free after threading through the tarp loop member 164, and attached to the temporary wall after the movable portion 150 has been moved up the I-beam to its desired position.

To hang one temporary wall T between two I-beams (or similar structural components) requires two devices 100, one for each I-beam. Each device is capable of hanging an end of two temporary walls, so that to hang two temporary walls between three I-beams, whether to form a linear wall configuration or to form a corner wall configuration, requires three devices 100, with the middle device raising and hanging ends of two temporary walls, one on either side of the I-beam. FIG. 3 illustrates using two devices 100, one device 100(1) positioned on I-beam A and another device 100(2) positioned on I-beam B. Prior to raising the devices, the tarp cable 180 is fed through the tarp loop member 164 of device 100(1) and then through apertures in the temporary wall T that is currently positioned on the ground or other surface. The tarp cable 180 continues to be fed through the tarp loop member of device 100(2) and down to a fixed tie off 182, such as an eye bolt or the like on the fixed portion 110 of device 100(2) or directly to the I-beam B. Alternatively, the distal end of the tarp cable 180 can be left loose for tying off after the temporary wall T is lifted.

Figure 4:
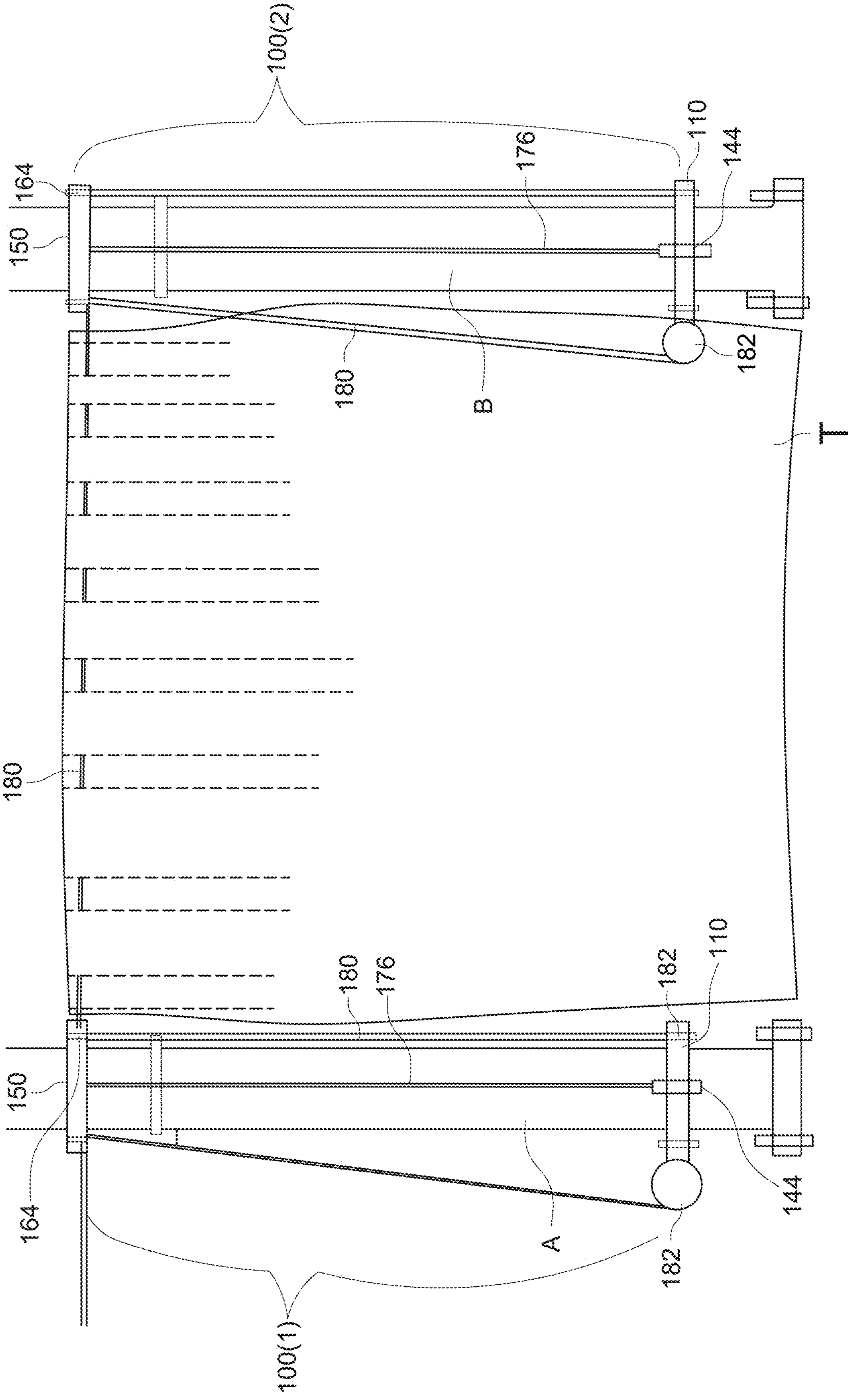
FIG. 4 is a schematic of the process of installing a temporary wall of FIG. 3 with the temporary wall in place.

As illustrated in FIG. 3, the drive crank 144 of device 100(1) is used to pull the drive cable 176 from the shaft 170, turning the shaft 170 and moving the drive wheel 158 of the movable portion 150 up to the desired height of the I-beam A. Once at the desired height, the friction fit of the drive wheel 158 and the wheels 160 against the I-beam A will hold the movable portion 150 in place. Alternatively, a safety wedge can be used to wedge the movable portion 150 against the I-beam A, as described in detail later. The temporary wall T may be permanently affixed at its corner to the tarp cable 180 at a predetermined location on the tarp cable 180 to that the corner would be raised to the level of the movable member 150. Alternatively, the temporary wall may be movable on the tarp cable 180 and spread out like a curtain on a rod when both devices 100(1) and 100(2) are raised to the desired height. In FIG. 3, the movable portion 150 of the device 100(1) is at the desired height on the I-beam A and the movable portion 150 of the device 100(2) is starting its rise. Device 100(1) is illustrated as having raised a corner of each of two temporary walls T and Ti. FIG. 4 illustrates the movable device 150 of the device 100(2) at the desired height so the temporary wall T is hung. Bottom corners of the temporary wall can be tied off onto the fixed portion 110 or directly onto the I-beam. Edges of adjacent temporary walls can be clamped together at one or more locations to reduce or eliminate the opening between adjacent temporary walls.

A second drive crank can be mounted on the fixed portion 110 of the device 100 or can be a separate device to tighten the tarp cable 180 to eliminate sag of the temporary wall T.

The loose end or the end tied to fixed tie off 182 is untied and fed through the second drive crank. To remove the temporary wall T, the tarp cable 180 is loosened and the temporary wall T is allowed to fall. Then the movable portions 150 of each device 100 is cranked in the opposite direction until it is resting on the respective fixed portion 110. The width adjustment mechanism 116, 156 of each portion is expanded to release the device 100 from the I-beam.

Figure 5A:
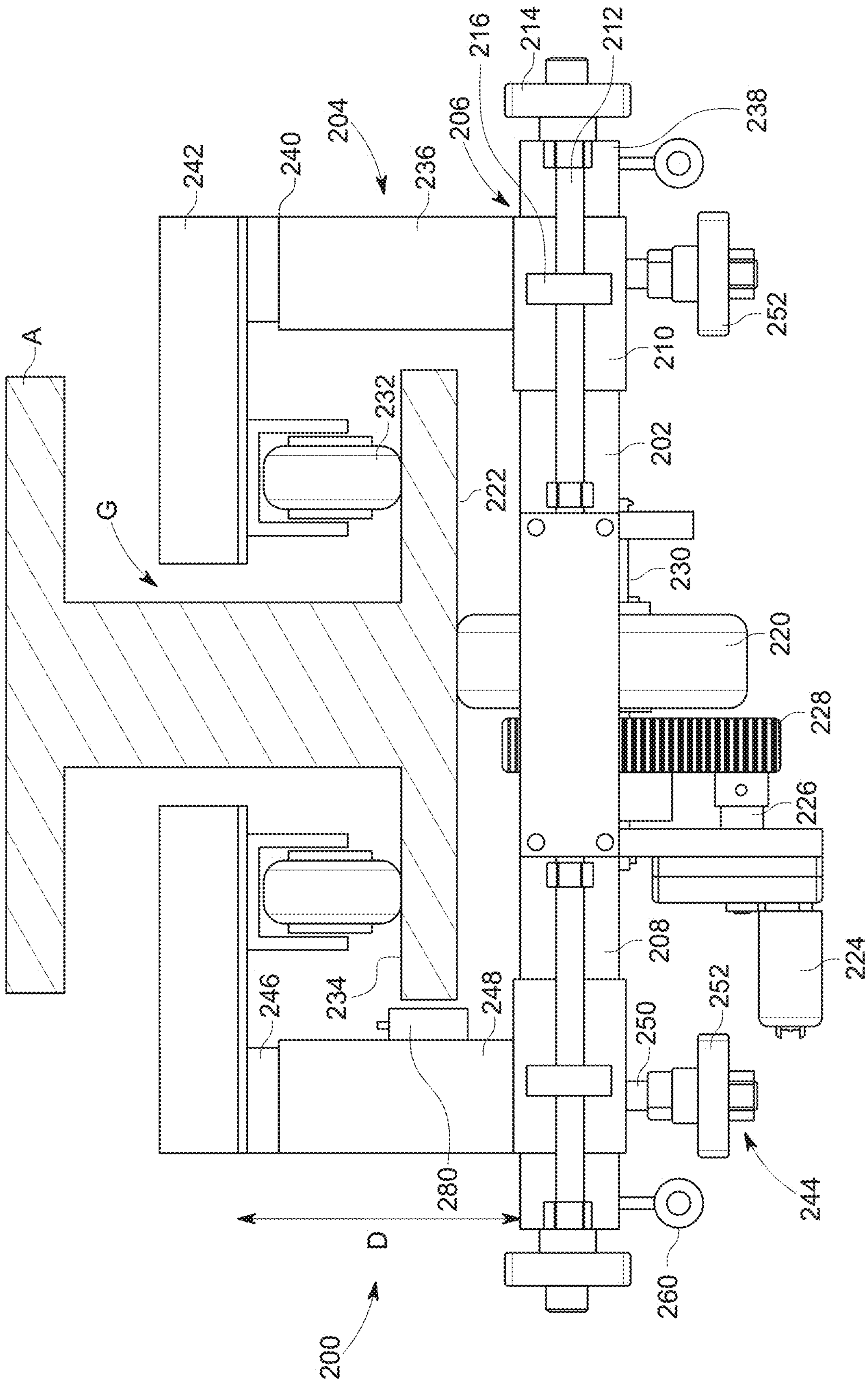
FIG. 5A is a plan view of another implementation of the column climbing building site protection device as disclosed herein.
Figure 5B:
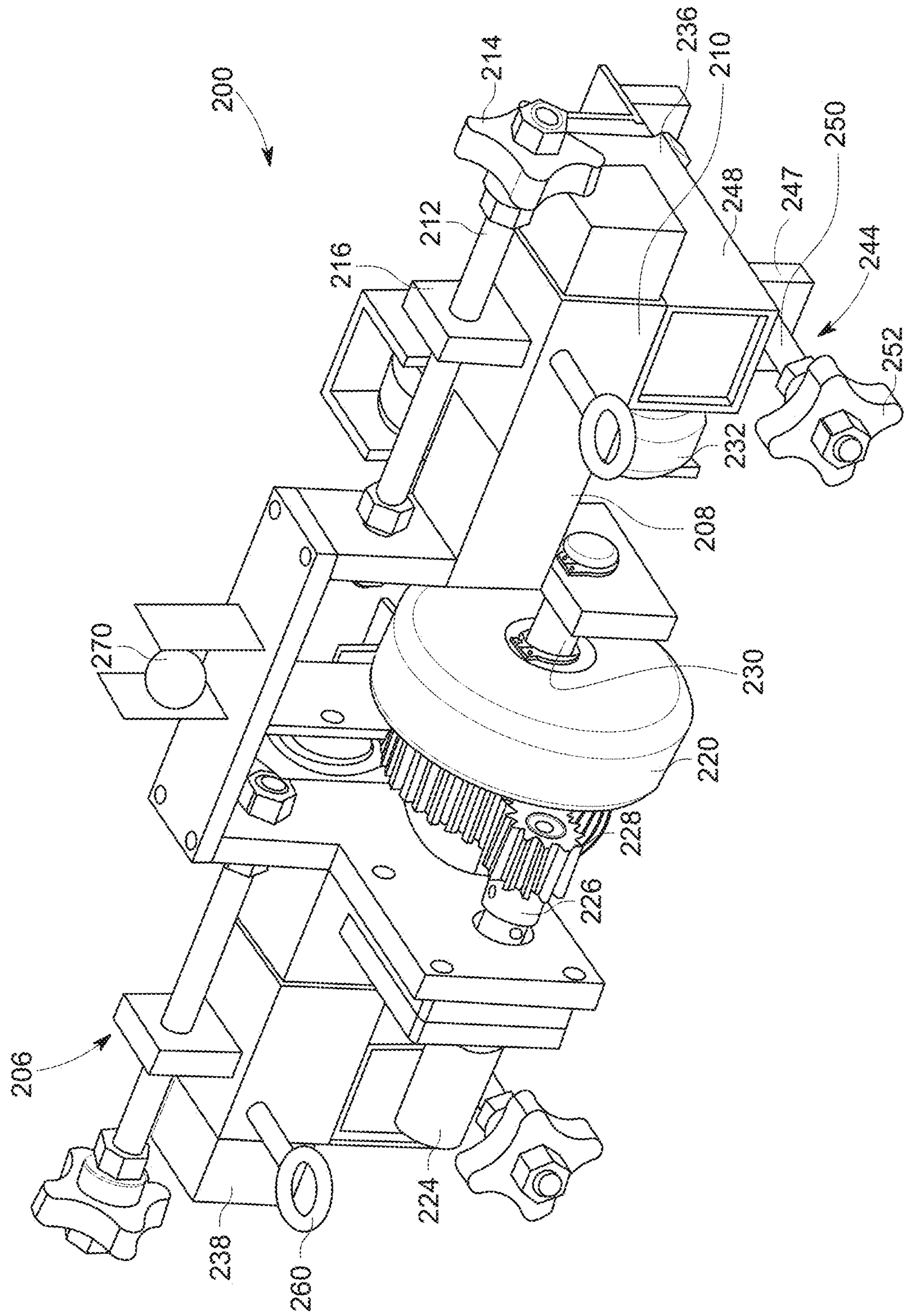
FIG. 5B is a front perspective view of the column climbing building site protection device of FIG. 5A.
Figure 5C:
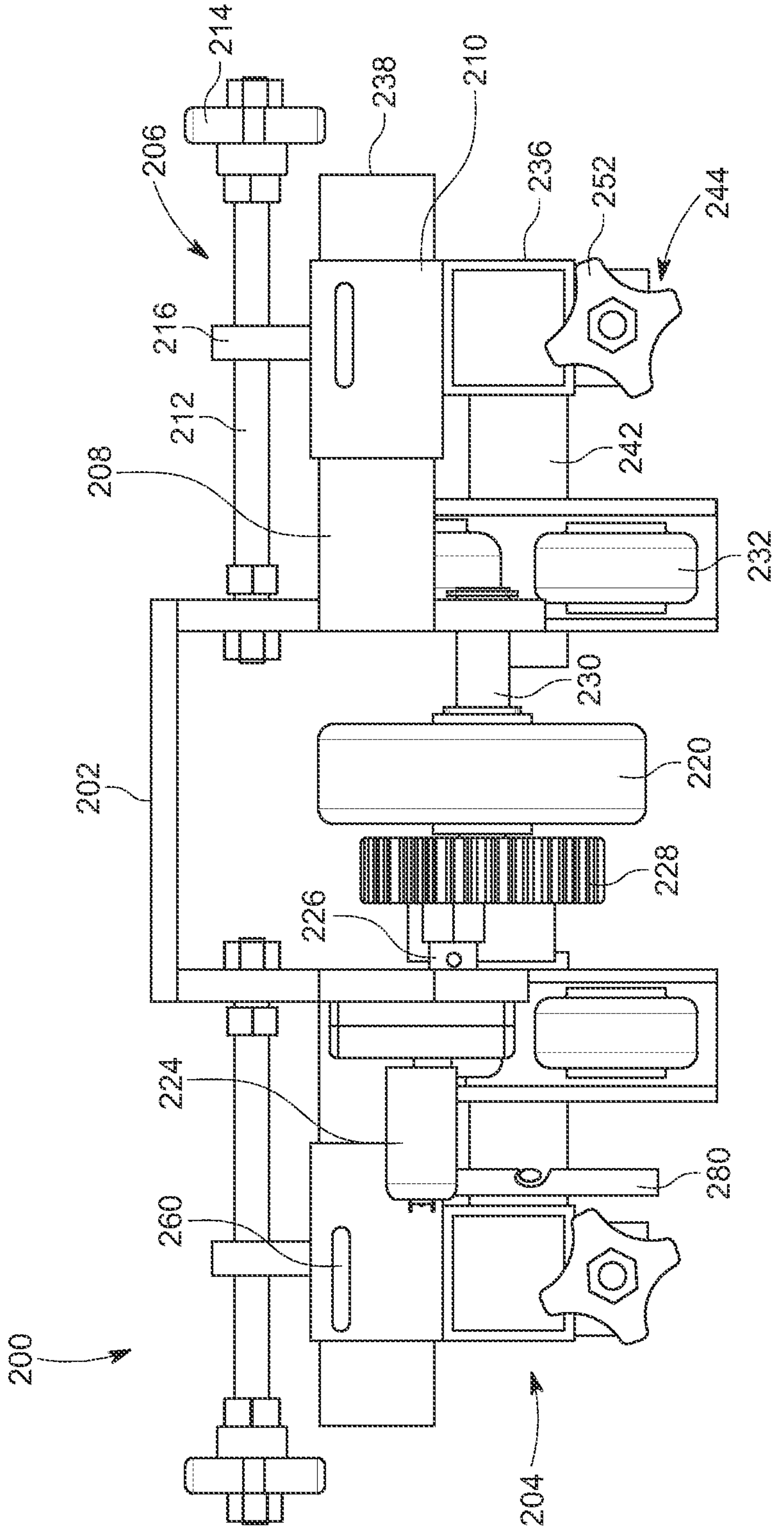
FIG. 5C is a front elevation view of the column climbing building site protection device of FIG. 5A.

Another implementation of the column climbing building site protection device 200 is illustrated in FIGS. 5A-5C. The device 200 has a similar structure to the movable portion 150 of the device 100. The column climbing building site protection device 200 includes a main body 202 and u-shaped, or hook portions 204, at each end of the main body 202. A width adjustment mechanism 206 is incorporated into the main body 202 to adjust the width of the main body 202. As illustrated in FIGS. 5A-5C, the main body 202 includes a fixed element 208 with two sleeves 210 that slide over the fixed element 208 and are at opposite ends of the fixed element 208. The hook portions 204 extend from respective sleeves 210. The width of a gap G between hook portions 204 is adjusted with the width adjustment mechanism 206, which has a threaded rod 212 received in a receiver 216, the threaded rod 212 attached to the main body 202 and the receiver 216 attached to the sleeve 210 such that when the threaded rod is rotated, the sleeve 210 moves along the fixed element 208 to either shorten or lengthen the gap G between the hook portions 204. The sleeve 210 can be moved by turning a handle 214 that turns the threaded rod 212 extending through the receiver 216, such as a nut or the like attached to the sleeve 210. Only one hook portion 204 may be attached to a sleeve 210 and movable with the width adjustment mechanism 206, so long as the configuration provides enough movement of the one sleeve 210 to sufficiently widen and shorten the gap G as needed. Alternatively, as illustrated in FIG. 2, the hook portions 204 can be directly attached to the main body 202 and the width adjustment mechanism can incorporate the ratchet and cog mechanism to adjust the width of the gap G by adjusting the length of the main body 202. Any other mechanism known to those skilled in the art is contemplated.

The main body 202 is attached to a drive wheel 220 configured to roll along a face 222 of the I-beam A (shown in FIG. 5A). Also attached to the main body 202 is a motor 224, which can be gas, electromagnetic or electric, for example. The motor 224 has a motor shaft 226 that rotates drive gears 228, that are in turn connected to a wheel shaft 230 on the drive wheel 220. A non-limiting example is a 24V DC gear-motor that drives two gears giving a final drive force of 62 lbs. at the drive wheel 220 contact point. A linear actuator secures the device 200 when it is at the desired elevation.

The hook portions 204 each have at least one free-rolling wheel 232 configured to roll along an opposite face 234 of the I-beam A. The number of wheels 232 can vary but should be selected to ensure the device 200 can move up the I-beam or other structural column sufficiently smoothly. The hook portions 204 are each configured with an arm 236 extending from the main body 202 proximate opposing ends 238 of the main body 202. From an end 240 of each arm 236 opposite the main body 202 extends a wheel support member 242 configured to hold the at least one wheel 232 on a surface of the wheel support member 242 facing the main body 202. The hook portions 204 each include a depth adjustment mechanism 244 to adjust the depth D of the hook portions 204 once the device 200 is situated on the I-beam so that there is a tight friction fit between the drive wheel 220 and the face 222 of the I-beam A and the wheels 232 and the opposing face 234 of the I-beam A (illustrated in FIG. 5A). The depth adjustment mechanism 244 lengthens and shortens the arm 236 of the hook portion 204 on which it is located. The arm 236 can have a main member 246 and a sleeve member 248 over the main member 246. A threaded rod 250 is attached to one of the sleeve member 248 and the main member 246, and a rod receiver 247 on the other of the sleeve member 248 and the main member 246, such that rotation of the threaded rod 250 within the rod receiver 247 moves the main member 246 with respect to the sleeve member 248. For example, the threaded rod 250 can extend through the sleeve member 248 to attach to a threaded opening or bolt in the main member 246. When the threaded rod 250 is turned via a handle 252, the threaded rod 250 will move the main member 246 further into the sleeve member 248 to shorten the arm 236 or further out of the sleeve member 248 to lengthen the arm 236. As another example, the rod receiver 247 can be attached to an exterior of one of the main member 246 and the sleeve member 248 and the threaded rod 250 can be attached to an exterior of the other. Alternatively, a mechanism as illustrated in FIG. 2 can be used, or other mechanisms known to those skilled in the art to achieve the depth adjustment.

The device 200 has at least one tarp loop member 260 proximate the end 238 of the main body 202 and can have one tarp loop member 260 at each end 238 of the main body 202 as illustrated. The device 200 can further include one or more lights 270 (illustrated in FIG. 5B), such as spotlights, attached to the main body 202 that can be used when the device 200 is positioned at the desired height on the I-beam. The light 270 can be any type of light or lamp desired and can be powered electrically via extension cord, for example, or with a battery and can be remotely controlled or simply plugged in when light is desired. The one or more lights 270 can also be incorporated on the movable portion 150 of device 100. The device 200 can further include a safety tie off, such as a D-ring or eye bolt, to be available as a tie-off point for a harness for personnel needing to tie off when working at elevated heights within the enclosed building site. The safety tie off can also be incorporated on the movable portion 150 of device 100.

Figure 6C:
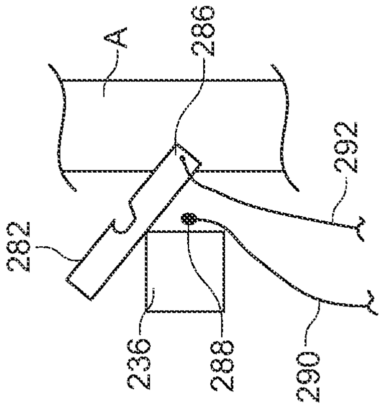
FIGS. 6A-6C are schematics of a wedge mechanism as disclosed herein and an aspect of each implementation of the column climbing building site protection device as disclosed herein.
Figure 6B:
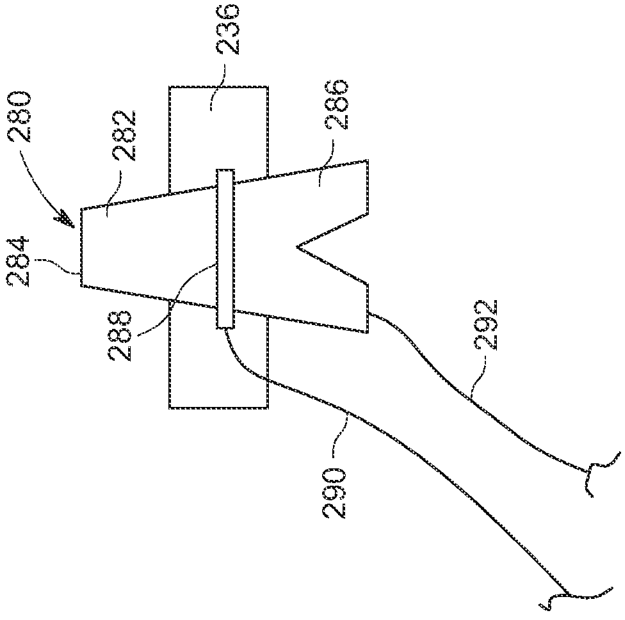
Figure 6A:
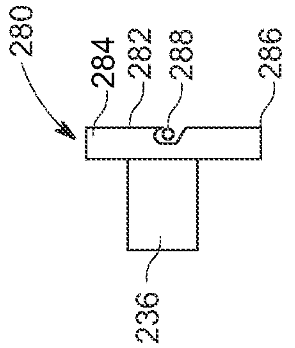

A wedge mechanism 280 can be incorporated into the device 200 on the arm 236 of the hook portion 204. One can be used, or two wedge mechanisms 280 can be used, one on the arm 236 of each hook portion 204. The wedge mechanism 280 is engaged once the device 200 is at the desired elevation, the wedge mechanism 280 further protecting the device 200 from any downward force. The wedge mechanism 280 illustrated in FIGS. 6A-6C has a wedge 282 with an upper end 284 and a lower end 286 that is in a V-shape to grab the edge of the I-beam A. The lower end 286 is biased toward the I-beam A but is held in a vertical position with a pin 288. When in the vertical position, the wedge mechanism 280 does not interfere or contact the I-beam A as the device 200 is being raised or lowered. The pin 288 is biased to a first position to keep the wedge 282 in the vertical position. When the device 200 is in place, the pin 288 is pulled out with a pin cord 290 (rope, cable or the like) by a person on the ground. The lower end 286 of the wedge 282 moves toward the I-beam A until it is in contact with the edge of the I-beam A in the V, wedged in place. When the pin cord 290 is released, the pin 288 is biased back to the first position but is now between the wedge 282 and the 236 arm. When the device 200 is to be lowered, the pin cord 290 is pulled to pull the pin 288 out of the first position and out of the way, and a wedge cord 292 that is connected to the lower end 286 of the wedge 282 (such as through an aperture) is pulled to pull the lower end 286 of the wedge 282 so that the wedge 282 is back in the vertical position. The pin cord 290 is released and the pin 288 moves back to the first position, holding the wedge 282 in the vertical position. The wedge cord 292 can then be released. The wedge mechanism 280 can be incorporated into the movable portion 150 of the device 100.

Figure 7:
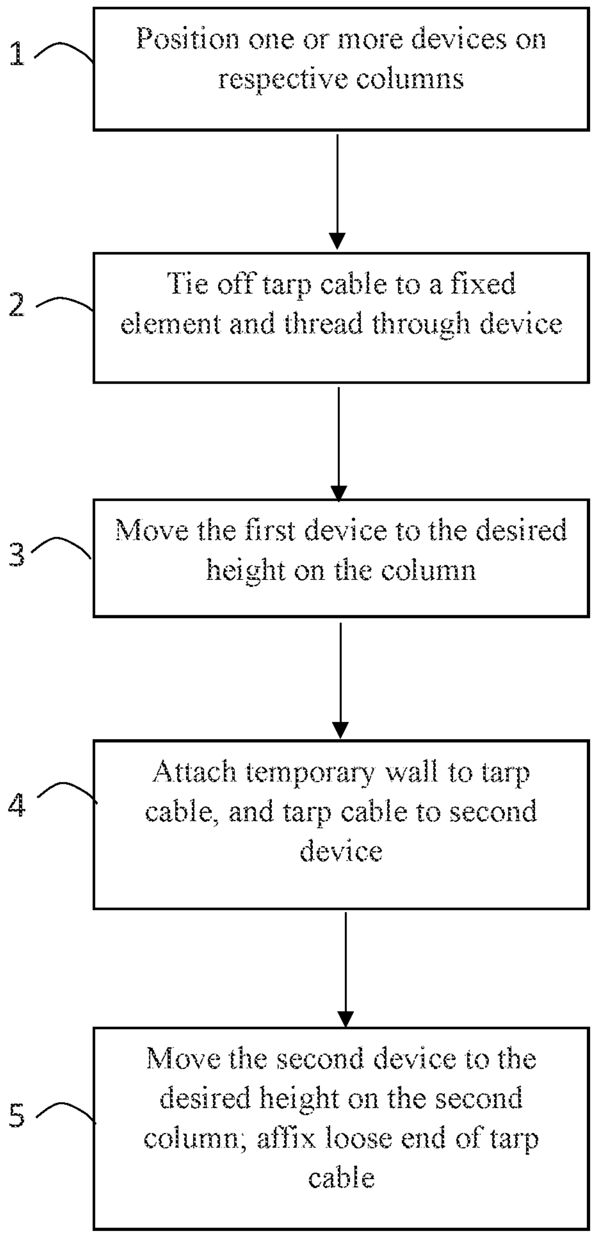
FIG. 7 is a flow diagram of a process of installing temporary walls to enclose a building site used the devices disclosed herein.

The process of installing a temporary wall T using the column climbing building site protection devices 200 is similar to the process described with reference to devices 100. In step 1 of FIG. 7, a device 200(1) is positioned on the I-beam A, likely proximate the ground or at an easy to reach vertical height. To position the device 200(1), the width adjustment mechanism 206 is adjusted to lengthen the main body 202 such that a gap G between the wheel support members 242 is wide enough to insert a wall of the I-beam A through the gap G. The width adjustment mechanism 206 is then adjusted to reduce the width of the main body 202 so that the wheels 232 of the hook portions 204 will contact the opposite face 234 of the I-beam A. The depth adjustment mechanism 244 on each hook portion 204 is tightened until the drive wheel 220 contacts the face 222 of the I-beam A and the wheels 232 contact the opposing face 234. The contact between the wheels and the I-beam should be sufficiently tight that the device 200 does not move.

In step 2, the tarp cable 290 is tied off at one end to a fixed element on the I-beam A or around the I-Beam A itself. The tarp cable 290 is threaded through the tarp loop member 260 and the loose end is left for later (along with sufficient length to extend the desired height of the I-beam and across the opening in which the temporary window will be installed and to a tie off point, likely on an opposing I-beam).

In step 3, the device 200(1) is moved along the I-beam A until it reaches the desired height. The motor 224 is started, moving the drive wheel 220 up the I-beam until the motor 224 is turned off. The motor can be turned on and off remotely or using a power cord to operate on/off switches, or by other means known to those skilled in the art. The device 200(1) will remain elevated on the I-beam A due to the force applied from the wheels 232 and the drive wheel 220.

Figure 8:
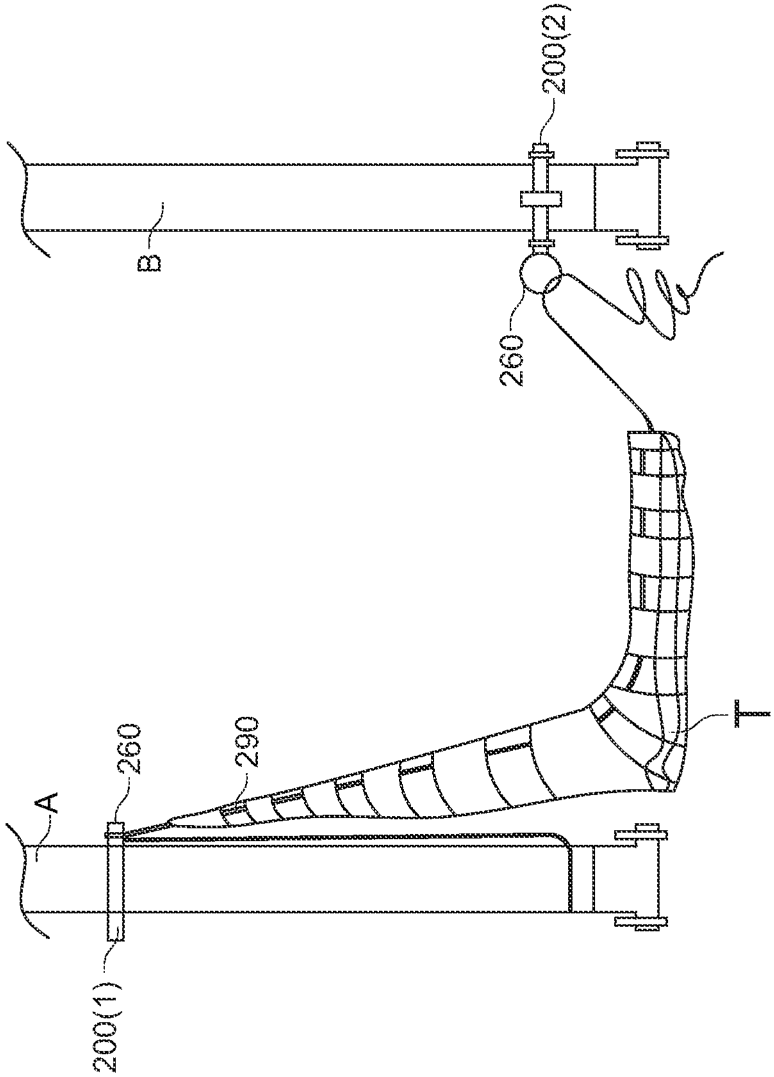
FIG. 8 is a schematic at step 4 of the process diagramed in FIG. 7.

In step 4, the tarp cable 290 is attached to the temporary wall T and to a second device 200 (2). This is schematically illustrated in FIG. 8. As an example, the loose end is fed through a hem in an edge of a tarp, or through apertures at an end of a tarp. The loose end is then fed through the tarp loop member 260 of the second device 200(2). The second device 200(2) can be positioned to I-beam B in step 1 or can be positioned on the I-beam B before the tarp cable 290 is fed through its tarp loop member 260.

In step 5, the second device 200(2) is moved along I-beam B until it reaches the desired height, which is likely equal to the height of the device on I-beam A, although not necessary. At this point, the temporary wall T is raised. A drive crank can be used to tighten the tarp cable to eliminate sag of the temporary wall. An end tied to the I-beam is untied and fed through the drive crank. Once at the desired tightness, the end is tied off again. Bottom corners of the temporary wall can also be attached to an adjacent I-beam to spread the load on the temporary wall across more points of contact.

If the devices 200 are fit with a wedge mechanism 280, the wedge mechanism 280 can be activated any time after the device 200 is at the desired height.

The process is continued with as many devices as necessary to form the requisite number of temporary walls to enclose the building site as desired.

To remove the temporary wall, the tarp cable is untied at an I-beam and the temporary wall is allowed to fall, with the loose end of the tarp cable unthreading from the device 200. If a wedge mechanism 280 is used, the wedge mechanism 280 is released as described above. Then the device 200 is moved down the I-beam with the motor, the gears in reverse, and removed from the I-beam for reuse as needed. The temporary wall is removed from the tarp cable for reuse, and the tarp cable is removed from the other device and I-beam. The second device is brought down the I-beam and removed from the I-beam.

The column climbing building site protection devices disclosed herein allow for the temporary enclosure of an area on one, two, three or all four sides. The temporary enclosure can be used for weather protection, protecting the enclosed construction site from wind, rain, snow and sun, as non-limiting examples. The temporary enclosure can be used to protect the enclosed site from outside construction debris, or to keep construction debris inside. The temporary enclosure can be used to protect the outside from dust when remodeling, or to protect the enclosed site from dust and dirt. The temporary enclosure can be used for privacy. The temporary enclosure can incorporate advertising as desired or required. The column climbing building site protection devices disclosed herein are not limited to hanging vertical temporary walls. The devices herein can be used to install temporary horizontal covers, or ceilings, to protect from sun and other weather, provide aerial privacy, etc. Four devices can be used to attach to a corner of a temporary ceiling, each device climbing to essentially the same height on a respective I-beam configured in a rectangular fashion. The devices herein can also "climb" or move along a horizontal I-beam or other horizontal column if desired or required. The column climbing building site protection devices disclosed herein can also be used to provide temporary lighting to building sites and to provide tie off points for safety harnesses. As used herein, "temporary" can be any length of time, and is likely to be any number of months for a typical building site.

Two column climbing building site protection devices are required to hang a wall, and additional devices are needed to hang additional walls. The devices remain in place until the temporary walls are taken down. The devices disclosed herein are made to be as lightweight as possible and cost effective. In one example, steel channel and angle pieces are used to form the main body and arms because they will not undergo major stresses or deformations during regular use of the device and are lighter in weight. The highest stress regions on the device occur closest to where the temporary walls will be attached to the device. The biggest stresses on the device occur on and around the eyebolts, primarily due to the high wind load that can be produced by the temporary wall. Some temporary walls can be about 50'×35' in height and width, and may see 50 mph winds. Though a temporary wall of this size weighs approximately 220 lbs., the wind load can reach 11,200 lbs. This load is divided over six points of contact with the two eye bolts on respective devices and one clamp at the bottom of each I-beam, resulting in a load of about 1,870 lbs. per point of contact. The loads are calculated using the stagnation pressure of a 50 mph wind over the whole temporary wall, here a tarp. All analyses showed that the devices disclosed herein can withstand the 50 mph static load.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A device for raising a temporary wall to enclose an area, the device comprising:

a main body;

a drive wheel attached to the main body and positioned centrally on the main body;

a motor mounted on the main body and configured to drive the drive wheel;

drive gears connected to a motor shaft and driven by the motor, the drive gears connected to the drive wheel by a wheel shaft;

hook portions, each of the hook portions attached proximate a respective end of the main body and comprising:

an arm member extending from a rear surface of the main body;

a wheel support member extending from the arm member at an end opposite the main body, the wheel support member extending substantially parallel to the main body;

a wheel attached to the wheel support member on a surface facing the main body; and a depth adjustment mechanism configured to adjust a depth of the device by adjusting a length of the arm member;

a width adjustment mechanism, wherein the wheel support member of each of the hook portions extend toward each other, the width adjustment mechanism configured to adjust a width of a gap between the wheel support members such that when the width of the gap between the wheel support members is adjusted ends of the wheel support members are spaced from the main body at a constant distance throughout the width adjustment; and a loop member attached to the main body and configured to receive a cable therethrough.

2. The device of claim 1, wherein the arm member of each of the hook portions comprises a main member and a sleeve member in which the main member is disposed, wherein the depth adjustment mechanism comprises:

a threaded rod attached to one of the sleeve member and the main member; and a rod receiver attached to the other of the sleeve member and the main member, such that rotation of the threaded rod within the rod receiver moves the main member within the sleeve member.

3. The device of claim 1, wherein the main body comprises a fixed element and a sleeve at each end of the fixed element and through which the fixed element extends, the width adjustment mechanism comprising:

a threaded rod attached to the fixed element; and a rod receiver attached to the sleeve, such that rotation of the threaded rod within the rod receiver moves the sleeve in relation to the fixed member.

4. The device of claim 1, further comprising a light attached to the main body.

5. The device of claim 1, further comprising a safety harness tie off attached to the main body.

6. The device of claim 1, further comprising a wedge mechanism attached to the arm member of each of the hook portions on an interior surface of the arm member, the wedge mechanism comprising:

a wedge having un upper end, a lower end, and a pin receiving portion between the upper end and the lower end, the lower end having a V-shaped notch; and a pin biased to a position within the pin receiving portion, wherein:

the wedge is attached to the arm member such that the lower end is biased away from the arm member;

the pin holds the wedge in a position perpendicular to the arm member when in the pin receiving portion; and the wedge is in a position oblique to the arm member when the pin is not in the pin receiving portion.

7. A method of installing a temporary wall using a first device that hangs one corner of the temporary wall and a second device that hangs an opposing corner of the temporary wall, each of the first device and the second device comprises:

a main body;

a drive wheel attached to the main body;

a motor mounted on the main body and configured to drive the drive wheel;

hook portions attached proximate each end of the main body, each of the hook portions comprising:

a wheel support member extending substantially parallel to the main body; and a wheel attached to the wheel support member on a surface facing the main body;

a width adjustment mechanism, wherein the wheel support members of the hook portions extend toward each other, the width adjustment mechanism configured to adjust a width of a gap between the wheel support members, the method comprising:

positioning the first device to a first I-beam and the second device to a second I-beam, the temporary wall configured to be installed to span a space between the first I-beam and the second I-beam;

threading a cable configured to support the temporary wall through a loop member of the first device, with one end of the cable fixed proximate a base of the first I-beam and a distal end left available to attach to the temporary wall;

moving the first device along the first I-beam to a desired height;

attaching the temporary wall to the cable via the distal end of the cable;

threading the distal end through a loop member of the second device and fixing the distal end proximate a base of the second I-beam; and moving the second device along the second I-beam to the desired height.

8. A method of installing a temporary wall using the device of claim 1, comprising:

positioning the device to an I-beam by:

adjusting the width adjustment mechanism such that the gap is wider than a width of the I-beam;

positioning the device such that the drive wheel contacts a front surface of the I-beam;

adjusting the width adjustment mechanism such that the wheel of each of the hook portions is aligned to contact an opposing surface of the I-beam; and adjusting the depth adjustment mechanism of each of the hook portions such that the wheel of each of the hook portions contacts the opposing surface of the I-beam;

threading a cable configured to support the temporary wall through the loop member of the device, with one end of the cable fixed proximate a base of the I-beam and a distal end left available to attach to the temporary wall; and moving the device along the I-beam to a desired height by operating the motor to move the drive wheel in a direction to move the device along the I-beam to the desired height.

9. The method of claim 8, further comprising an additional device, the method further comprising:

positioning the additional device to an additional I-beam;

attaching the temporary wall to the cable via the distal end of the cable;

threading the distal end through a loop member of the additional device and fixing the distal end proximate a base of the additional I-beam; and moving the additional device along the additional I-beam to the desired height.

10. The method of claim 9, further comprising:

after the additional device is at the desired height, attaching the distal end of the cable to a drive crank and cranking the cable tight to eliminate sagging of the temporary wall.

11. A device for raising a temporary wall to enclose an area, the device comprising:

a fixed portion having a main body and a hook portion at each end of the main body, the fixed portion comprising:

a fixed portion width adjustment mechanism configured to adjust a width of a gap between the hook portions; and a drive crank; and a movable portion having a main body of the movable portion and a hook portion at each end of the main body, the movable portion comprising:

a movable portion width adjustment mechanism configured to adjust a width of a gap between the hook portions of the movable portion;

a depth adjustment mechanism configured to adjust a depth of the movable portion;

a drive wheel on the main body of the movable portion;

a wheel on a surface of each of the hook portions facing the main body of the movable portion;

drive gears connected via a wheel shaft to the drive wheel; and a cable shaft wrapped with a cable and connected to the drive gears, the cable connected to the drive crank of the fixed portion, the cable shaft configured to rotate to move the drive gears as the drive crank pulls the cable and unwinds the cable from the cable shaft.

12. The device of claim 11, wherein each of the hook portions of the movable portion has an arm member extending from a rear surface of the main body of the movable portion, the arm member comprising a main member and a sleeve member in which the main member is disposed, wherein the depth adjustment mechanism comprises:

a threaded rod attached to one of the sleeve member and the main member; and a rod receiver attached to the other of the sleeve member and the main member, such that rotation of the threaded rod within the rod receiver moves the main member within the sleeve member.

13. The device of claim 11, wherein the main body of each of the fixed portion and the movable portion comprises a fixed element and a sleeve at each end of the fixed element and through which the fixed element extends, the width adjustment mechanism comprising:

a threaded rod attached to the fixed element; and a rod receiver attached to the sleeve, such that rotation of the threaded rod within the rod receiver moves the sleeve in relation to the fixed member.

14. The device of claim 11, further comprising a light attached to the main body of the movable portion.

15. The device of claim 11, further comprising a safety harness tie off attached to the main body of the movable portion.

16. The device of claim 11, further comprising a wedge mechanism attached to each of the hook portions of the movable portion on an interior surface, the wedge mechanism comprising:

a wedge having un upper end, a lower end, and a pin receiving portion between the upper end and the lower end, the lower end having a V-shaped notch; and a pin biased to a position within the pin receiving portion, wherein:

the wedge is attached to the respective hook portion such that the lower end is biased away from the hook portion;

the pin holds the wedge in a position perpendicular to the respective hook portion when in the pin receiving portion; and the wedge is in a position oblique to the respective hook portion when the pin is not in the pin receiving portion.

* * * * *